United States Patent

[11] 3,567,858

[72] Inventor John W. Ecklin
40 Alexis Road, Woodbridge, Va. 22191
[21] Appl. No. 735,040
[22] Filed June 6, 1968
[45] Patented Mar. 2, 1971

[54] APPARATUS FOR CONVERTING SLOW ERRATIC DATA TO HIGH EVEN DATA
3 Claims, 1 Drawing Fig.

[52] U.S. Cl. .......... 178/17.5, 179/15, 340/172.5
[51] Int. Cl. .......... H04l 13/08
[50] Field of Search .......... 179/2, 15 (VDR), 15 (A), 15 (Async); 178/17.5, 81; 340/172.5

[56] References Cited

UNITED STATES PATENTS 3,403,225 9/1968 Mislan .......... 179/2

*Primary Examiner*—Ralph D. Blakeslee
*Attorneys*—Harry M. Saragovitz, Edward J. Kelly, Herbert Berl and Aubrey J. Dunn ABSTRACT: Data to be fed into a computer is typed on the keyboard of a modified teleprinter, providing a record. The electrical signals from the teleprinter are stored on a magnetic disc memory. On a carriage-return signal from the teleprinter, the memory rapidly reads out at a rate compatible to computer magnetic tape. If a typing error is made, the teleprinter carriage is backspaced, and the error manually erased from the print record by the typist. A signal is sent from the teleprinter to the memory when a backspace is performed, which signal backspaces the disc, and erases the last stored data signal. When the correct key of the keyboard is depressed, the correct signal is stored in memory and is typed on the print record.

PATENTED MAR 2 1971 3,567,858
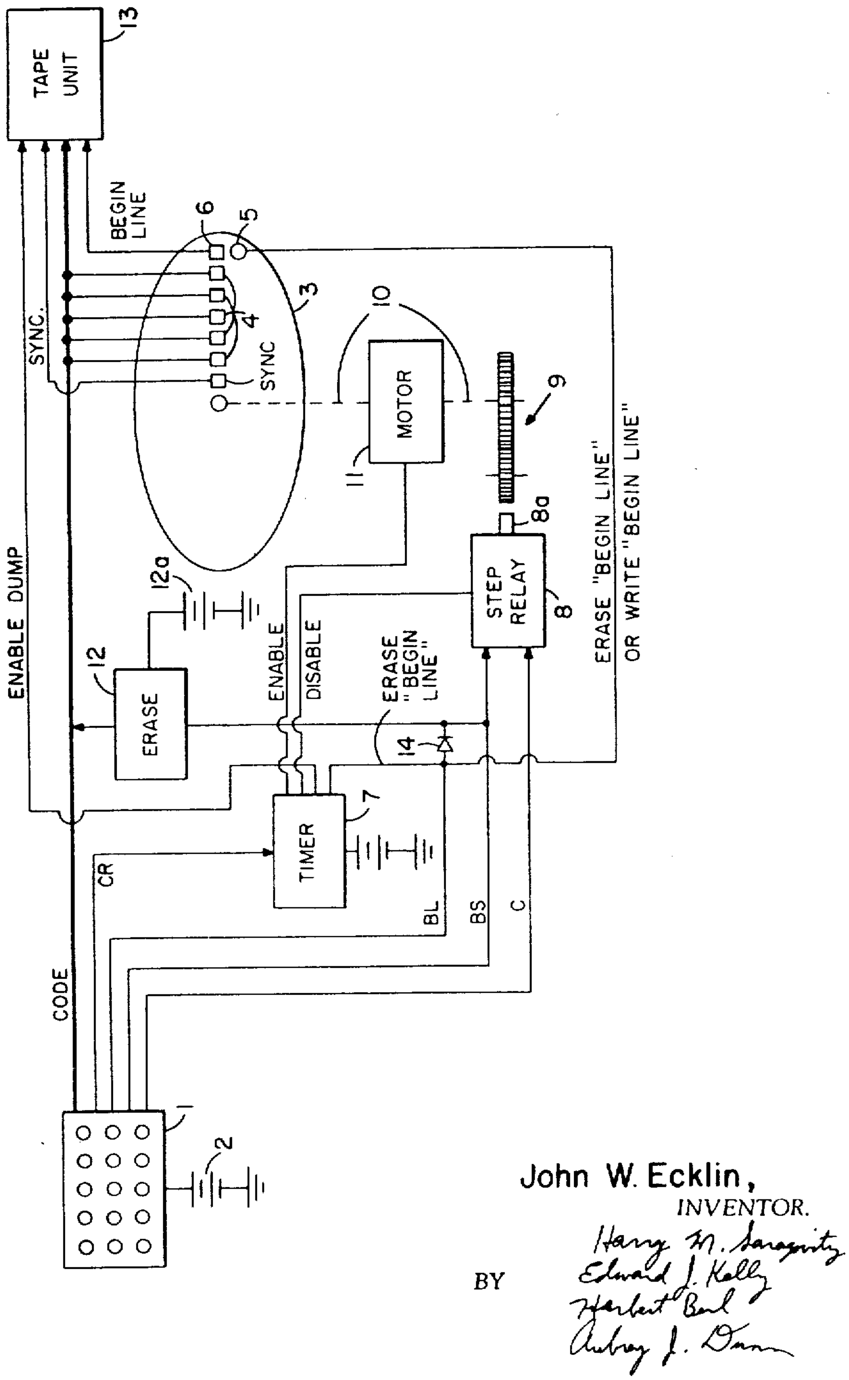
John W. Ecklin,
INVENTOR.
BY Harry M. Saragovitz
Edward J. Kelly
Herbert Berl
Aubrey J. Dunn

APPARATUS FOR CONVERTING SLOW ERRATIC DATA TO HIGH EVEN DATA

DEDICATORY CLAUSE

The invention described herein may be manufactured, used, and licensed by or for the Government for governmental purposes without the payment to me of any royalty thereon.

BACKGROUND OF THE INVENTION

This invention relates to the entry of data into a computer. Various devices and methods are known for entering data into a computer, such as punched tape or card recordings. When a punched tape or card is prepared, a print of the data is not always prepared. In order for a check to be made on the data, the tape or card must be read by the proper reader, and a printout obtained. On those devices which do make a direct print of the data as it is recorded, an error can only be corrected by punching a special code on the tape or card, so that the error will not appear on a printout from the tape or card. The direct print of the data retains the error, plus a print of the special code.

SUMMARY OF THE INVENTION

An apparatus whereby data to be entered into a computer is manually typed on a teleprinter. The electrical signals from the teleprinter are temporarily stored in a memory and are readout when a carriage-return is performed. If an error is typed, the carriage is backspaced, the error erased, and the correct character is typed. The error is also deleted from the memory, and the correct character is stored therefor.

An object of this invention is to provide a novel input device for a computer.

Another object is to provide an input device for a computer, which device allows for easy correction or errors, and which is cheap and simple.

BRIEF DESCRIPTION OF THE DRAWING

The single FIGURE of drawing shows a schematic description of the apparatus of the invention.

DESCRIPTION OF THE PREFERRED EMBODIMENT

Referring to the drawing, the inventive apparatus includes a modified teleprinter (or the like), designated 1. A specific example of 1 is the I.B.M. 1407 Console Inquiry Station. Element 1 is modified so that when a carriage-return is performed, a signal is provided on the line marked CR. Electrical signals are provided on a cable designated Code Line, as the characters are selected, in accordance with the data which it is desired to enter into the computer. The Code Line is understood to consist of a plurality of individual conductors, equal in number to the number of code elements. As the keys on the keyboard of the teleprinter are depressed, various combinations of the conductors of the Code Line have voltages applied thereto. Battery 2 provides the voltage for the operation of 1, and appears on the selected output lines. In addition to the Code Line, four special lines are used, namely: Backspace (BS), Carriage-Return (CR), Character (C), and Begin Line (BL). A signal appears over the BL when the first character of each line is selected on the keyboard. This signal may come from a switch (not shown) activated upon operation of the first character key of each line. Signals only appear on the BS and CR lines when the backspace and carriage-return keys are activated. A signal appears on the C line for each character. A recording disc 3 has a permanently recorded sync track and has various heads therewith, including a head for reading the sync signals, write-read heads 4 for the character, a write-erase head 5 for Begin Line-Erase Line, and read head 6 for Begin Line. A timer (7) is provided and is activated in response to carriage-return signals over line CR. A step relay (8) cooperates with gears 9 to move disc 3 step-by-step, through a shaft indicated by the dotted line 10. Shaft 10 may be the armature shaft of motor 11. Step relay 8 is activated through line C as each character is selected on keyboard 1, and causes, through pawl 8a, stepwise forward movement of disc 3. As each character key of the keyboard is selected, heads 4 record proper combinations on disc 3. If the backspace key of the keyboard is selected, a signal appears on line BS, and causes relay 8 to impart a backward step to disc 3. Line BS also sends a signal to erase unit 12, so that the character recorded in the space to which disc 3 is backspaced is erased. Erase unit 12 includes battery 12a for the erase power. A new character key on keyboard 1 may then be selected for each erased combination, and recorded in place of the erased character. Obviously, disc 3 may be backspaced as many steps as desired, and the above operation will obtain. At the end of a line of characters, the carriage-return key of keyboard is selected, and a signal appears over line CR to timer 7. Timer 7 provides timed signals on its various output lines, which lines are labeled: Enable Dump, Disable, Enable and Erase "Begin Line". Signals are provided on the Enable and Disable lines at approximately the same time. The Disable Line signal causes pawl 8a of step relay 8 to be retracted, and clear gears 9. The Enable Line signal causes motor 11 to begin rotating, and spinning disc 3. After an interval sufficient for disc 3 to reach proper angular velocity for readout, a signal is applied over the Enable Dump line to tape unit 13. Other lines connected to unit 13 are from the sync read head on disc 3, the character write-read heads on disc 3, and the Begin Line head of disc 3. After an interval sufficient to allow the disc to be read out, a signal is provided on the Erase "Begin Line" conductor. This signal causes head 5 to erase the "begin line" signal on disc 3. At the same time, through diode 14, the erase unit 12 is activated, and the characters on disc 3 are erased. After the erasure of the characters and the "begin line" signal, all outputs from timer 7 cease, and the system returns to a state suitable for recording of another line of characters. Timer 7 may take any one of several forms, such as a counting chain with various taps for the various outputs, or switches cam-activated by a rotating shaft.

It can be seen from the above description that an apparatus is provided. Capable of accomplishing conversion from slow erratic data to high even data. Characters typed at a slow erratic rate on keyboard 1 are stored on disc 3, and are read out a high synchronous rate upon operation of the carriage-return key of the keyboard.

While a particular apparatus embodiment of the invention has been shown and described, other embodiments may be obvious to one skilled in the art, in light of this disclosure. Disc 3 may, if desired, employ separate read and write heads. If polar type signals are provided by keyboard 1, erase unit 11 would be unnecessary, inasmuch as signals being recorded would erase those signals already on the disc. Erase unit 11 would be necessary only for neutral signals from keyboard 1.

I claim:

1. A device for converting slow erratic data into high even data comprising:
   - a teleprinter having a keyboard, voltage means, and electrical output lines, whereby various ones of said lines are connected to said voltage means in response to operation of the keys of said keyboard;
   - a magnetic disc recorder for storing electrical representations of the voltage;
   - means for presenting different areas of said storage means to said lines as said keys are operated;
   - means for deleting a stored representation; and
   - means for causing all of said stored representations to be read out, and whereby said means for deleting said representations after they are read out.

2. The device as defined in claim 1 wherein said means for presenting is a step relay having first and second inputs; a first special signal line connected from said keyboard to said first input, and wherein said relay imparts stepwise motion in a first angular direction to said disc when a signal is applied to said first input.

3. The device as defined in claim 2 wherein said means for deleting includes erase means connected to said magnetic heads; a second special signal line connected for said keyboard to said second input of said step relay, and whereby said relay imparts a second stepwise motion opposite in direction to said first stepwise angular motion.